July 25, 1939.  C. E. WYRICK  2,167,165

AUTOGRAPHIC REGISTER

Filed May 14, 1937 7 Sheets-Sheet 1

Inventor
CLAYTON E. WYRICK,
BY Toulmin & Toulmin
Attorneys

July 25, 1939.　　　C. E. WYRICK　　　2,167,165
AUTOGRAPHIC REGISTER
Filed May 14, 1937　　　7 Sheets-Sheet 2
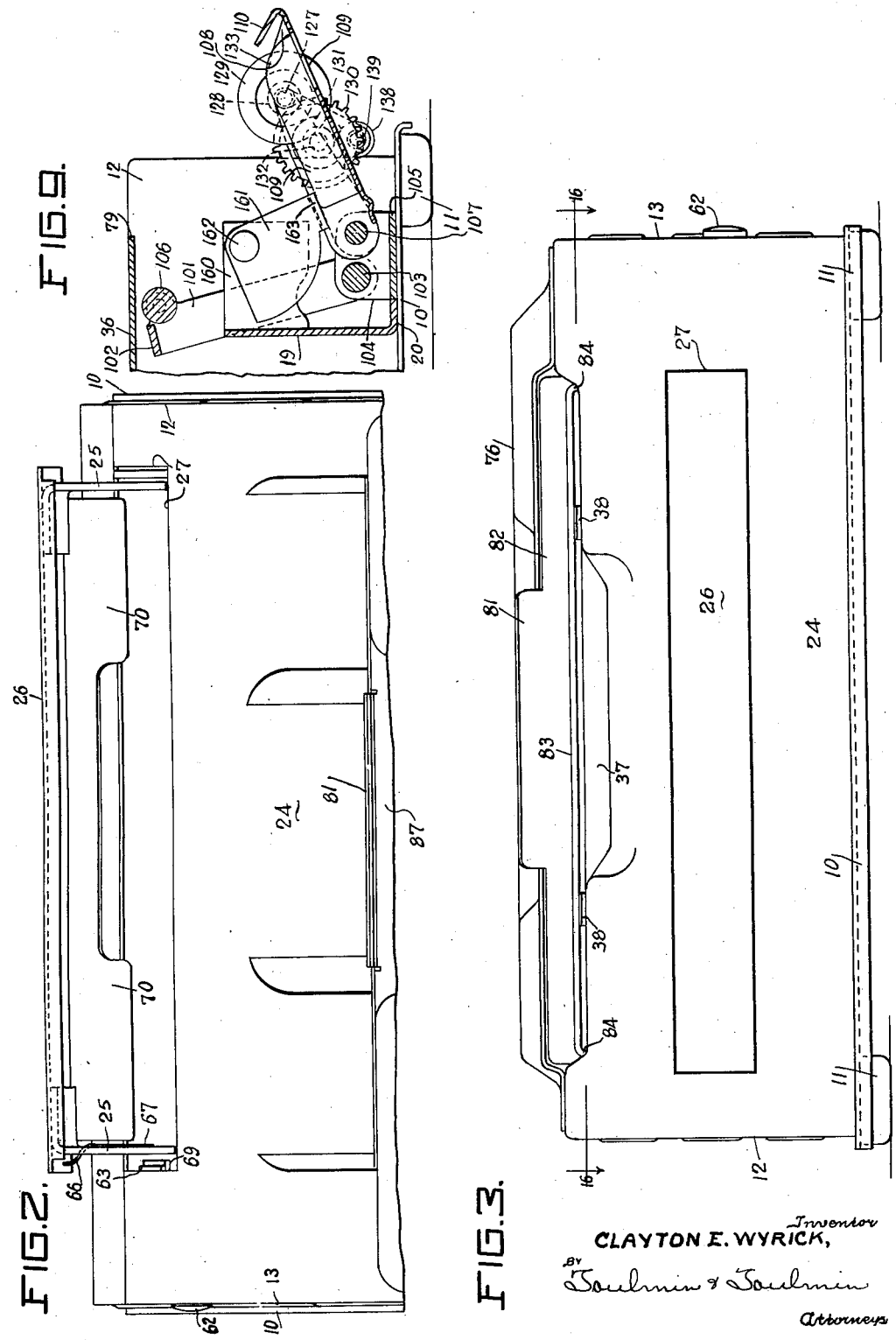
CLAYTON E. WYRICK, Inventor
By Toulmin & Toulmin
Attorneys

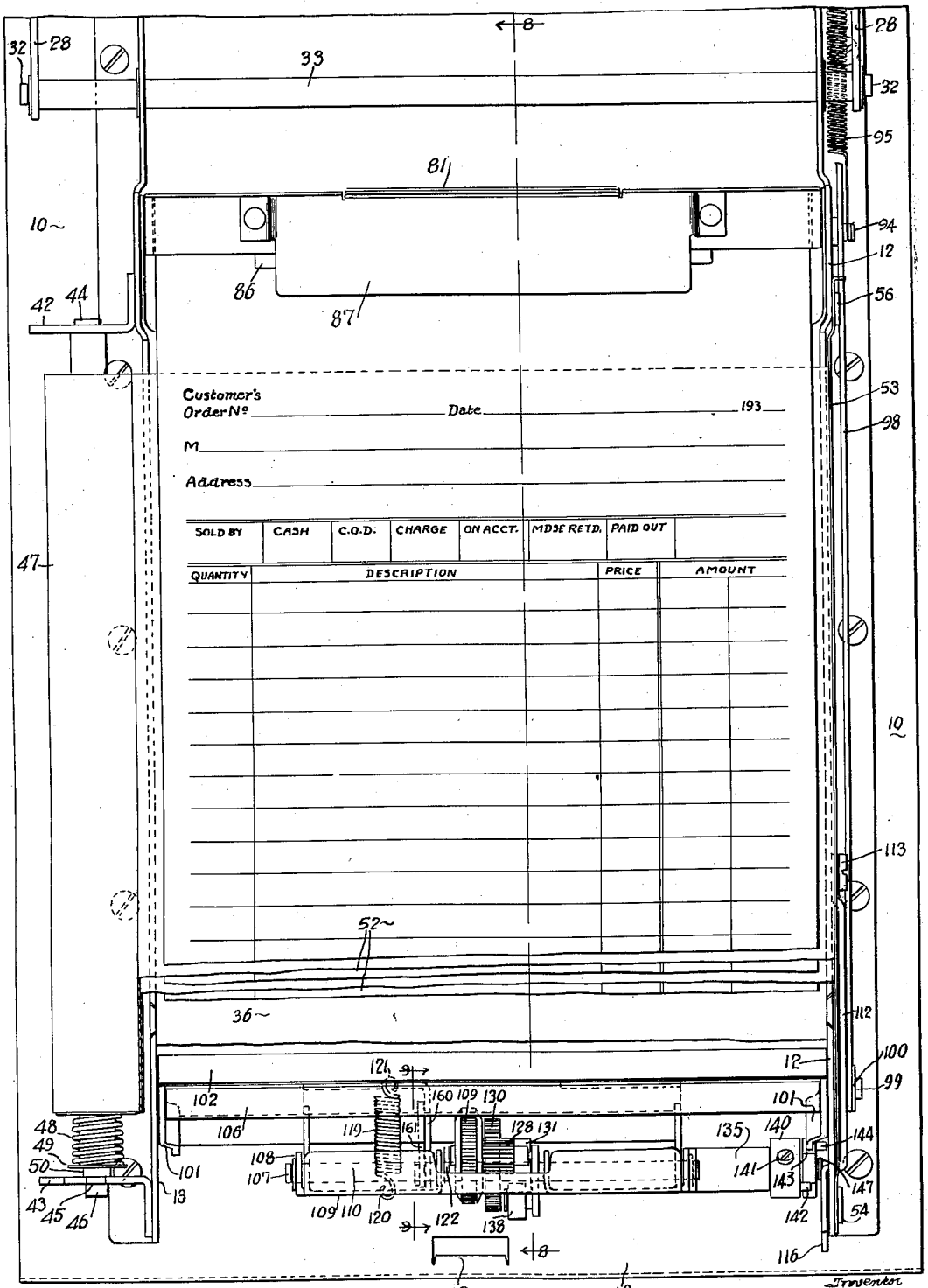

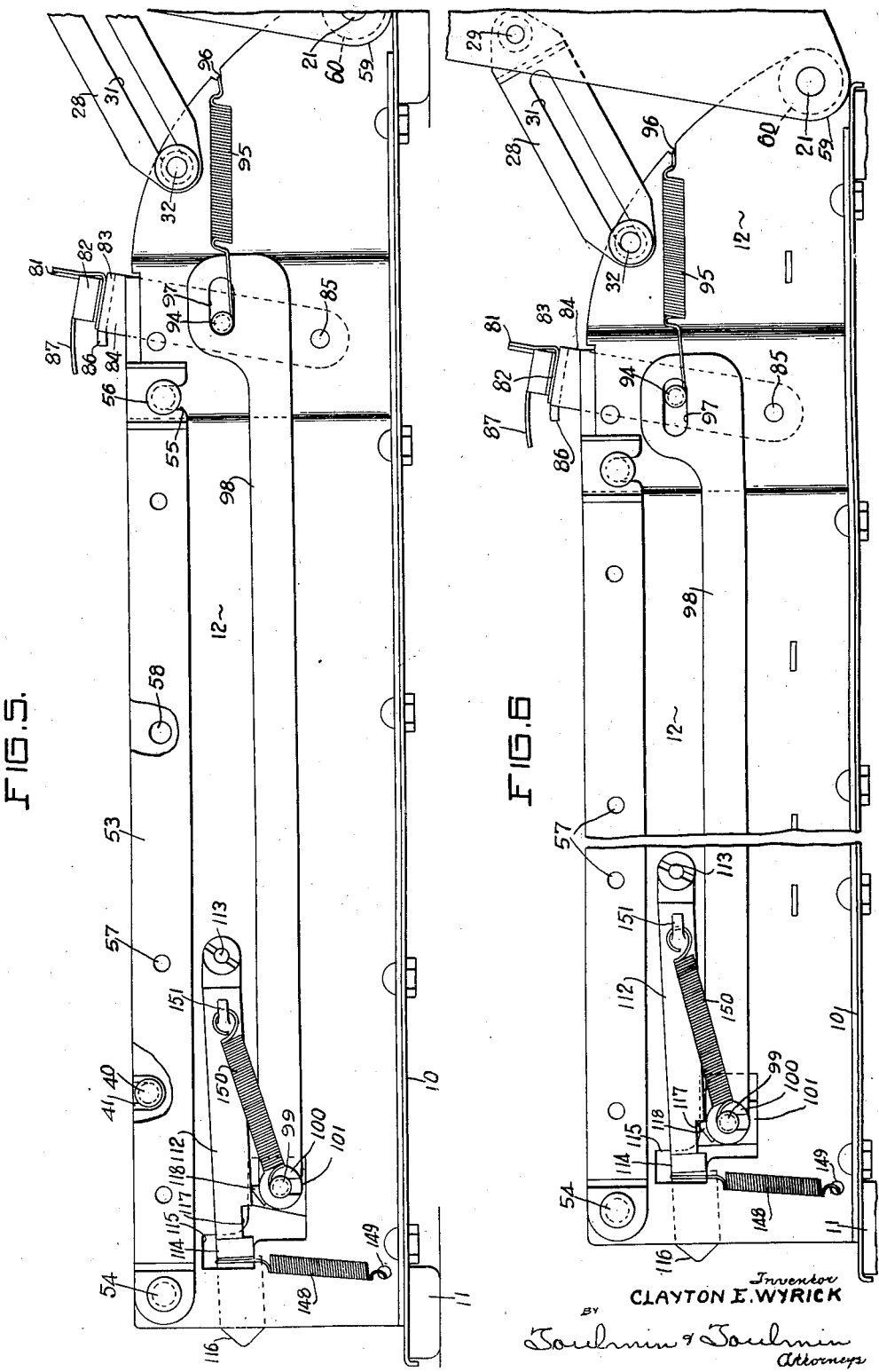

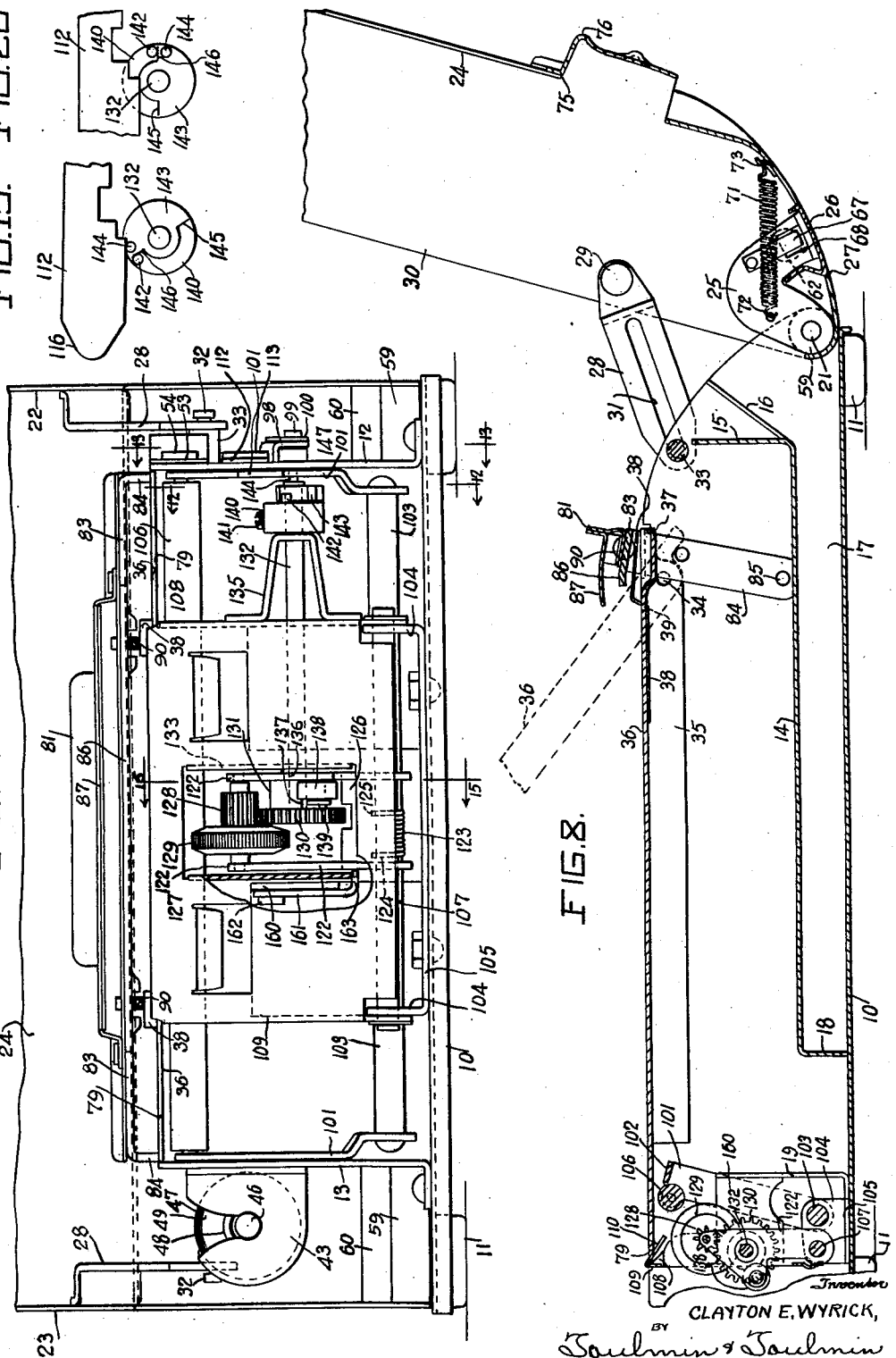

July 25, 1939.   C. E. WYRICK   2,167,165
AUTOGRAPHIC REGISTER
Filed May 14, 1937   7 Sheets-Sheet 6
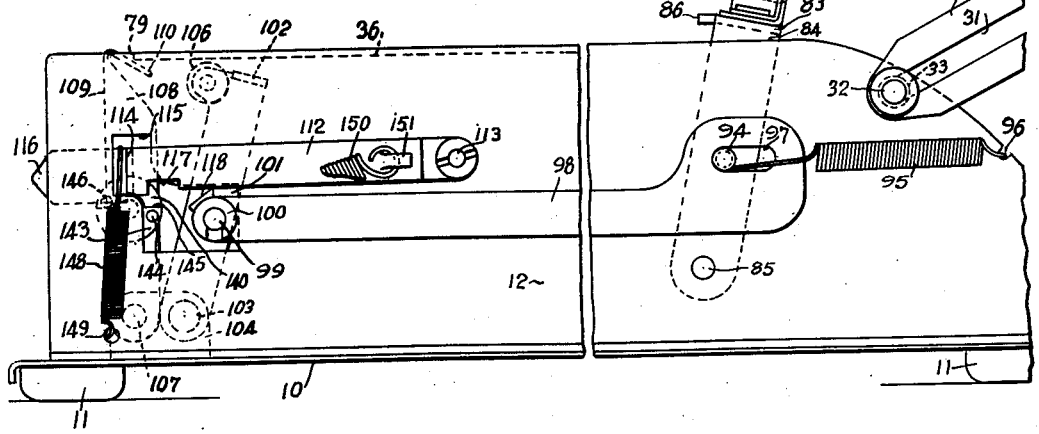
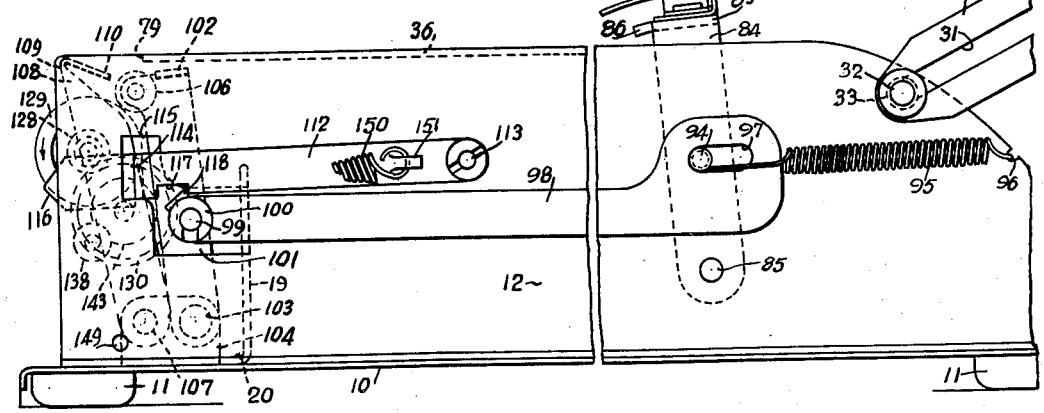
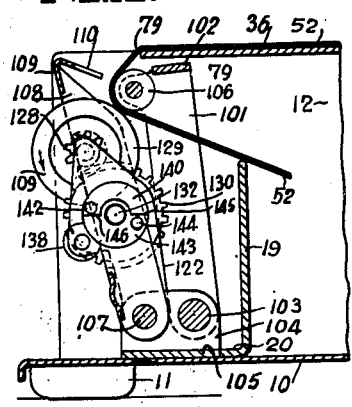 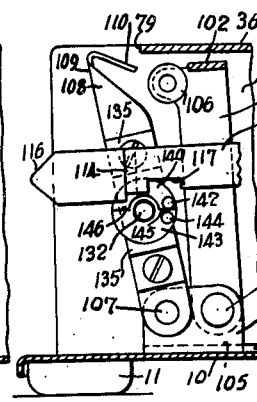 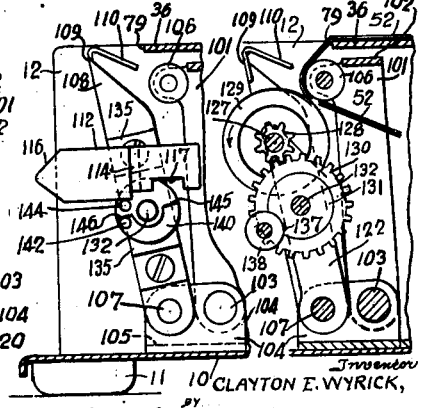
CLAYTON E. WYRICK,
BY Toulmin & Toulmin
Attorneys July 25, 1939.  C. E. WYRICK  2,167,165
AUTOGRAPHIC REGISTER
Filed May 14, 1937  7 Sheets-Sheet 7
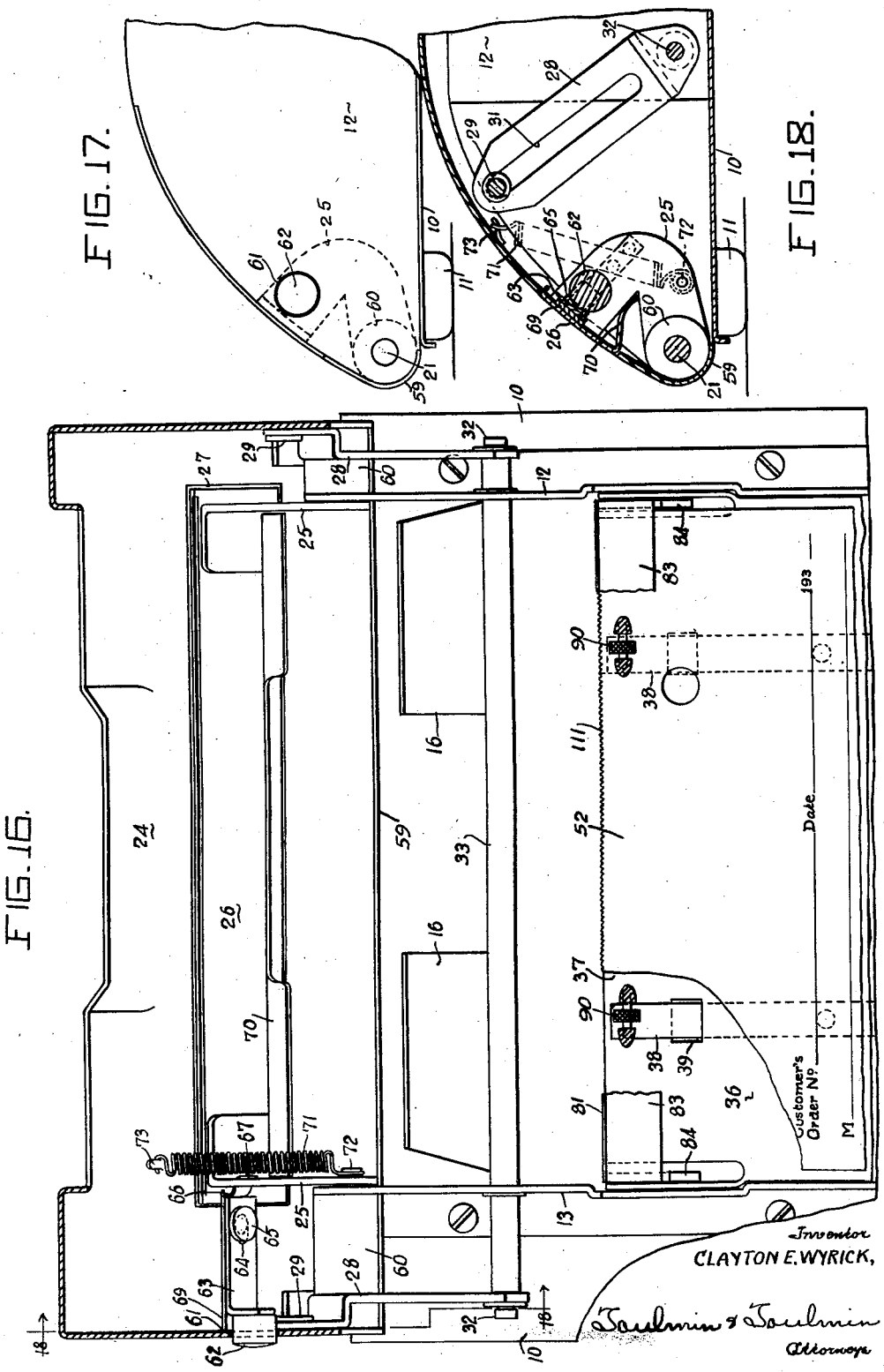
Inventor
CLAYTON E. WYRICK,
Toulmin & Toulmin
Attorneys Patented July 25, 1939

2,167,165

UNITED STATES PATENT OFFICE 2,167,165

AUTOGRAPHIC REGISTER

Clayton E. Wyrick, Wyandotte, Mich., assignor to The Egry Register Company, Dayton, Ohio, a corporation of Ohio Application May 14, 1937, Serial No. 142,662

22 Claims. (Cl. 282—12)

This invention relates to autographic registers, and in particular, to portable autographic registers having mechanisms permitting the extraction and detachment of sheets of predetermined lengths.

One object of this invention is to provide an autographic register having means for rapidly measuring out predetermined lengths of webs or strips.

Another object is to provide an autographic register with means for measuring out predetermined lengths of webs or strips, and for locking the web in a substantially fixed position after each measuring operation.

Another object is to provide such a measuring register, wherein means is provided for aligning the web or strip after each measurement so that the measuring device is brought back to zero after each measurement, thereby preventing cumulative errors of measurement.

Another object is to provide such a register with means for separating the web and the measuring device during the aligning operation.

Another object is to provide an autographic register of the above described type, wherein the webs are in the form of zigzag folded strips.

Another object is to provide such a register wherein the zigzag folded webs are operated in connection with an aligning member associated with the measuring means.

Another object is to provide an autographic register wherein zigzag folded webs are employed in conjunction with a measuring device for measuring out predetermined lengths of the web, together with an aligning member and mechanism for altering the normally acute angle of the zigzag folded strip to an obtuse angle at the aligning member in order to enable the web to pass easily around the aligning member during the measuring operation.

Another object is to provide an autographic register, as described above, wherein the means for altering the normally acute angle of the web to an obtuse angle is coupled with mechanism for shifting the measuring means into engagement with the web while its adjacent fold forms an obtuse angle.

Another object is to provide an autographic register, as described immediately above, wherein there is provided means responsive to a predetermined motion of the measuring device for permitting a predetermined length of the web to be withdrawn, whereupon the mechanism operates to substantially lock the web in a temporarily fixed position, thereby making possible withdrawal difficult until the next measuring operation takes place.

Another object is to provide a manual controlling device which is operatively connected to the measuring mechanism to move it into and out of engagement with the web for performing a measuring operation, and for substantially locking the web in a fixed position, respectively.

Another object is to provide an autographic register of the above described character, wherein means is provided for supporting and guiding copying or manifolding elements between certain of the webs.

Another object is to provide a portable autographic register having the previously described mechanism, wherein a storage compartment is provided within the casing of the register, this storage compartment being constructed with a movable closure which may be conveniently operated for the insertion of copies of the sheets which have been written upon.

Another object is to provide means for firmly holding the web or webs during the writing operation, and for releasing them without the tendency of drawing them rearwardly as the releasing member is moved in that direction.

Another object is to provide a tear-off member in association with the web releasing member as described above.

Another object is to provide an autographic register, as described above, wherein the measuring mechanism and the web releasing means are operatively interconnected so that one operates in response to the action of the other.

Another object is to provide an autographic register employing zigzag folded webs in conjunction with an aligning member, means being provided for changing the angle of the web fold from acute to obtuse in the neighborhood of the aligning member, this angle-changing means being operatively connected to a manually operated member adjacent the tear-off edge of the web.

Cross reference is hereby made to the copending application of William C. Pfeiffer, Ser. No. 159,743, filed August 18, 1937, and assigned to the same assignee, but directed to a modification of the present invention and containing claims which are subsidiary to certain of the broader claims herein.

In the drawings:

Figure 2 is a top plan view, similar to the forward portion of Figure 1, but with the closure for the storage compartment in its open position.

Figure 3 is a front elevation of the forward end of the autographic register shown in Figures 1 and 2.

Figure 4 is a top plan view of the major portion of the register shown in Figure 1, but with the cover raised in order to disclose more completely the measuring and aligning mechanism beneath the cover.

Figure 5 is a right-hand side elevation of the register shown in Figure 4, with the cover in its raised position to disclose the mechanism, with its parts in an unlatching condition wherein the web fold is substantially fixed against the aligning member.

Figure 6 is a view similar to Figure 5, but with the mechanism parts in a latched position, wherein the web is in a vertically unfolded position for engagement by the measuring mechanism.

Figure 7 is a rear end elevation of the register with the top raised, as in Figure 4.

Figure 8 is a vertical longitudinal section through the register, taken along the line 8—8 in Figure 4, with the cover raised.

Figure 9 is a fragmentary vertical longitudinal section, taken along the line 9—9 in Figure 4.

Figure 10 is a view of portions of the mechanism similar to Figure 5, but with certain parts broken away to show the unlatching positions of the elements more clearly.

Figure 11 is a view similar to Figure 10, but with the parts in the latched positions shown in Figure 6, but before the actuating member has been returned to its forward position.

Figure 12 is a fragmentary vertical section along the line 12—12 in Figure 7, showing details of the measuring and aligning mechanism with the parts in position at the beginning of the measuring operation.

Figure 13 is an elevation taken along the line 13—13 in Figure 7, showing in diagrammatic form the position of certain of the latching and releasing parts of Figure 12 at a further stage in the measuring operation.

Figure 14 is a view similar to Figure 13, but with the parts substantially at the end of the measuring operation, just prior to the release of the measuring mechanism and locking of the web.

Figure 15 is a vertical section along the line 15—15 of Figure 7, showing details of the measuring mechanism.

Figure 16 is a horizontal section, partly broken away, and taken substantially along the line 16—16 in Figure 3.

Figure 17 is a side elevation of the left-hand forward end of the autographic register.

Figure 18 is a fragmentary vertical section taken along the line 18—18 of Figure 16.

Figure 19 is a diagrammatic view showing the action of the latch mechanism.

Figure 20 is a view similar to Figure 19, with the parts in a different position.

General construction

Figure 1:
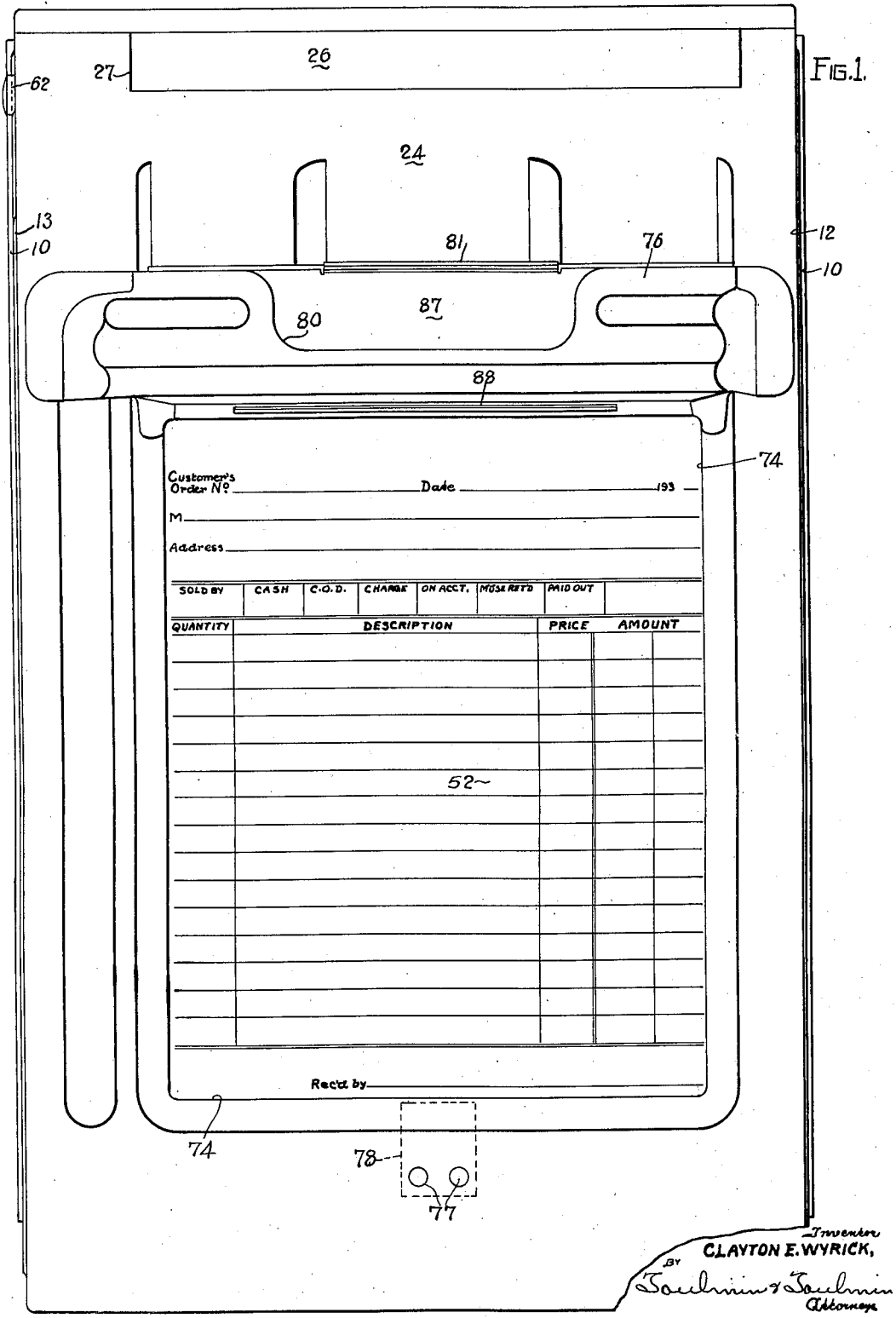
Figure 1 is a top plan view of one embodiment of the autographic register of this invention, showing a printed web portion in position for writing.

In general, the autographic register of this invention consists of a writing table and a compartment for zigzag folded webs. Associated with the writing table is an aligning member, such as a straight edge, for engaging the folds in the webs and thereby locking the webs in position by reason of the inability of the acute angles of the webs to pass by a straight edge. Associated with the aligning member is a measuring device which is brought into operative engagement with the web whenever withdrawal of the web is desired, as by operating a releasing lever or member manually. The operation of the manual releasing member moves an angle-changing element into engagement with the web so as to change its normally oblique angle to an obtuse angle in the neighborhood of the aligning member or straight edge, thereby facilitating its passage around the straight edge. Concomitantly with this the measuring mechanism is brought into engagement with the web.

The subsequent withdrawal of the web, as by pulling it while grasping it between the fingers, causes the measuring mechanism to operate and to go through a predetermined motion. At the end of this predetermined motion the measuring mechanism actuates devices which cause the angle-changing element to be released from the web, at which time another fold of the web has arrived at a position adjacent the aligning member or straight edge. The same operation results in the disengagement of the measuring mechanism from the web so that the realignment of the acute angled fold of the web takes place while the measuring mechanism and unfolding element are disengaged from the web. The result of this is to prevent cumulative errors of measurement by causing the measuring mechanism to return to its zero position before a new measurement has commenced. These cumulative errors seriously retard the successful use of measuring devices for measuring out webs.

Casing construction

The autographic register casing assembly consists of a base plate 10 (Figures 5 to 8), having supporting feet 11 secured thereto for supporting the base plate upon a table or counter. Rising from the base plate 10 are side walls 12 and 13 on the right and left-hand sides of the assembly. Arranged between the side walls 12 and 13 and spaced above the base plate 11, is a floor plate 14 (Figure 8) upon which the stacked webs are placed in zigzag folded form. The forward end of the floor plate 14 is bent in three directions. The midportion 15 is bent upwardly substantially at right angles so as to form an end positioning member for the web pack, whereas the portions 16, on opposite sides of the portion 15, are bent at angles thereto so as to form members for guiding detached web portions into the storage compartment 17, located in the space between the floor plate 14 and the base plate 10. The rearward edge of the floor plate 14 is bent downwardly, as at 18, to form a rear wall for the storage compartment, the side walls of which are formed by the side walls 12 and 13 of the casing assembly. An angle member 19 is secured, as at 20, to the base plate 10 and serves as a rearward limiting stop for the folded web pack in a similar manner to the action of the bent portion 15 of the floor plate 14.

Journalled in the side walls 12 and 13 are pivot rods 21 which support the opposite sides 22 and 23 of the casing cover, generally designated 24. Also pivotally mounted upon the inner ends of the pivot rods 21 are the bent arms 25 (Figure 8), the forward ends of which support a movable closure 26 for a slot 27 in the forward wall of the casing cover 24. The motion of the casing cover 24 is limited by a pair of slotted arms 28 pivoted, as at 29, to the side walls 30 of the casing cover and having slots 31 engaging the grooved ends 32 of a rod 33 secured to the side walls 12 and 13 of the casing assembly (Figure 4).

Pivotally mounted upon the pins 34 on the side walls 12 and 13 are the downwardly directed flanges 35 of the writing table 36 (Figure 8). The forward end of this writing table is depressed, as at 37, to form a space wherein the forward ends of the webs can be conveniently grasped between the fingers of the operator. Secured to the under side of the writing table 36 are bent spring fingers 38 which pass upwardly through slots 39 in the top thereof, emerging immediately above the depressed portion 37. These spring fingers engage the under side of the paper webs and tend to push them upward so as to make grasping more convenient. The rearward ends of the writing table 36 are provided with studs 40, which come to rest in U-shaped slots 41 in the upper edges of the side walls 12 and 13 (Figure 5). The studs 40 and slots 41 cooperate to position the writing table 36 when it is lowered to the writing position. The writing table 36 may be raised around its pivot pins 34 by lifting the rearward end thereof, this being shown by the dotted lines in Figure 8. With the writing table 36 in its raised position, the zigzag folded web packs may be more easily inserted into the space immediately above the floor plate 14.

Secured to the left-hand side of the casing assembly and mounted upon the side wall 13 are brackets 42 and 43, respectively. The bracket 42 is provided with a hole 44 and the bracket 43 with a slot 45 for the reception of the supporting shaft 46 of a carbon roll 47. A spring 48 (Figure 4) and a sliding washer 49 impel a sliding collar 50 into engagement with the bracket 43 and cause the carbon roll 47 to be firmly held in its brackets 42 and 43. The carbon roll 47 carries rolled up webs 51 of manifolding material. The individual manifolding or copying webs 51 are interleaved between the individual record webs 52 having the printed forms thereon. The free ends of the manifolding webs 51 are firmly held in position against the side wall 12 by means of a carbon-retaining bar 53 which is pivoted, as at 54, to the side wall 12 and provided with a U-shaped slot 55 at its opposite end engaging a stud 56 secured to the side wall 12 (Figures 5 and 6). The carbon-retaining bar 53 is provided with projections 57 which yieldingly engage depressions or holes 58 in the side wall 12 (Figure 5), thereby releasably retaining the bar 53 in its carbon-clamping position.

The cover 24 is spaced apart from the forward ends of the side walls 12 and 13 by collars 59 and 60, mounted upon the pivot rods 21. The cover 24 is provided with an aperture 61 through which a button 62 extends (Figure 2). This button is mounted upon the end of an L-shaped reciprocating member 63, which is slotted as at 64, and guided in its reciprocation by a stud 65 mounted on the under side of the cover 24. Cooperating with the inner end of this member 63 is a spring latch 66, one end of which is secured as at 67 (Figure 8) to the arm 25 supporting the closure 26. The free end of the spring latch 66 is bent outwardly and extends through an aperture 68 in the arm 25 so that it engages the inner side of a fixed bar 69 arranged beneath the reciprocating member 63 and secured to the inner side of the cover 24. The closure 26 is provided with a bent flange 70 along its lower edge so as to provide guidance for the detached web portions as they are inserted through the opening 27 into the storage compartment 17.

When the closure 26 is pushed into its closed position the free end of the spring latch 66 snaps into place behind the free end of the fixed bar 69 and holds the closure 26 in its closed position. When the button 62 is depressed the member 63 pushes the free end of the spring latch 66 off the end of the bar 69, whereupon the closure 26 flies open in response to the urge of a coil spring 71 (Figure 8) having its ends secured, as at 72 and 73, to the arm 25 and cover 24, respectively. The cover 24 is provided with an aperture 74 (Figure 1) which discloses the writing space upon the individual webs 52.

Above the forward part 75 of this aperture 74 (Figure 8) is mounted a bridge member 76 secured at its opposite ends to the cover 24. Secured, as at 77, to the under side of the cover 24 immediately beneath the rearward edge of the aperture 74, is a spring finger 78, the free end of which is bent downwardly so as to yieldingly engage the webs 52 and urge them into contact with the writing table 36 immediately adjacent its rear edge 79 (Figure 8). The rearward edge 79 of the writing table 36 also serves as an aligning member for the webs 52 by engaging the folds between successive webs, as will be described hereinafter in detail. The forward edge of the bridge member 76 on the cover 24 is cut away, as at 80, to permit the free motion of a handle 81 which is moved to and fro by the operator during the operation of the autographic register.

For this purpose the handle 81 consists of an upwardly extending portion, the lower part 82 of which (Figure 3) is mounted upon the cross bar 83 having downwardly bent ends 84 pivotally supported upon the pins 85 for swinging movement (Figure 6). The cross bar 83 is extended rearwardly, as at 86, and above it is mounted a curved shield plate 87 secured to the handle 81 and adapted to cover the space beneath the cutaway portion 80 in the bridge member 76. The bridge member 76 is provided with a slot 88 to permit the passage of the shield plate 87 therethrough when the handle 81 is moved rearwardly (Figure 1). Mounted in slots 89 in the cross bar 83 are two corrugated rollers 90. These rollers are arranged immediately above the spring fingers 38 and engage the uppermost surface of the webs 52, the lowermost surface of which is engaged by the spring fingers 38. When the handle 81 is moved rearwardly (Figure 8) the corrugated rollers 90 rotate as they move rearwardly over the uppermost surface of the webs 52, and at the same time the forward ends of the spring fingers 38 are permitted to rise by reason of their having been freed from engagement with the rollers 90. This action pushes up the forward edges of the webs 52 and positions them more conveniently for grasping by the operator, who inserts his fingers in the depressed portion 37 for this purpose. The cover is releasably held in its closed position by the engagement of a spring latch (not shown) operated by a button and engaging the upwardly projecting portion 93 in the base plate 10.

*Measuring and aligning mechanism*

The measuring and aligning mechanism is operated by the handle 81 and the portions 84 of the swinging cross bar 83. For this purpose a stud 94 (Figures 5 and 6) is mounted upon one of the portions 84 and serves not only as an anchorage for one end of a coil spring 95, the opposite end of which is anchored as at 96 to the side wall 12, but also engages a slot 97 in a reciprocating bar 98. The reciprocating bar 98 is pivotally mounted at its opposite end on a stud 99, and retained in position by a washer 100. The stud 99 is mounted upon one of a pair of swinging arms 101, the upper ends of which are interconnected by the cross member 102, and the lower ends of which are pivotally supported upon the pivot rod 103. The pivot rod 103 is mounted upon the upwardly extending ends 104 of a bracket 105 (Figure 8) mounted upon the base plate 10.

Immediately adjacent the cross member 102 and mounted between the arms 101 is a rotatable roller 106. Likewise mounted in the upwardly extending ends 104 of the bracket 105 is a pivot rod 107, to which are attached the flanged ends 108 of a swinging plate 109. The latter is provided with an angularly bent top edge portion 110 (Figures 8 and 12) which is adapted to pass beneath the aligning edge 79 of the writing table 36 when the plate 109 swings into its forward position. The webs 52 pass from their position upon the floor plate 14, around the roller 106 and through the space between the aligning edge 79 and the bent portion 110 of the swinging plate 109.

The purpose of the roller 106 is to change the normally acute angle between the adjacent sections of the webs 52 to an obtuse angle, as shown in Figure 12, and thereby to enable the folds of the webs 52 to move around the aligning edge 79 without locking thereagainst. When the roller 106 is in its forward position (Figure 8), however, it no longer engages the webs 52 and their folds again become acute angles, thereby locking themselves firmly against the aligning edge 79 of the writing table 36. The bent portion 110 of the swinging plate 109 assists in maintaining this angle in an acute position. The roller 106 and its swinging arms 101 are moved to this fold-releasing position when the handle 81 is moved rearwardly, thereby causing the stud 94 to engage the rearward ends of the slot 97 and move the reciprocating bar 98 rearwardly, thereby swinging the stud 99 on the swinging arm 101 likewise rearwardly.

The swinging arms 101 are held in their rearward or fold-releasing positions by a latch bar 112 which is pivoted to the side wall 12 by the stud 113 mounted thereon. The forward end of the latch bar 112 is bent in a zigzag direction, as at 114, and passes through a vertical slot 115 in the side wall 12, emerging in a portion 116 parallel to its original length. Adjacent the zigzag bent portion 114 is a notch 117 on the under side of the latch bar 112. This notch serves to receive a detent portion 118 formed by bending over the rearward end of the reciprocating bar 98. Consequently, when the handle 81 is moved rearwardly (Figure 6), the fold-releasing roller 106 is moved from the position shown in Figure 8 to that shown in Figure 12, and held in this position by the engagement of the detent portion 118 with the notch 117. The swinging plate 109 is provided with a coil spring 119 anchored thereto, as at 120, and to the upwardly extending portion of the angle member 19, as at 121. This coil spring 119 serves to urge the swinging plate 109 forwardly. The fold-releasing roller 106 and its swinging arms 101 are prevented from moving forwardly so long as the detent portion 118 of the reciprocating bar 98 engages the notch 117 upon the latch bar 112, until the latter is automatically raised by the measuring mechanism mounted upon the swinging plate 109 and actuated by the withdrawal of the webs 52.

This measuring mechanism consists of an H-shaped swinging frame 122 (Figures 4 and 7), the lower ends of which are mounted upon the pivot rod 107 and urged in a forward direction by the coil spring 123 coiled therearound. One end 124 bears against the inner wall of the swinging plate 109 and the other end 125 engages the cross bar 126 of the H-frame 122. The latter is thus urged in a forward direction independently of the swinging plate 109, which itself is urged in the same direction by the coil spring 119.

Mounted upon a shaft 127 extending between the upper ends of the H-frame 122 is a pinion 128, to which is secured a knurled wheel 129. The pinion 128 meshes with and drives a gear 130 secured to a hub 131, fixed to a shaft 132. The latter is journalled at its inner end in a bent portion 133 (Figure 7) formed by cutting an aperture 134 in the swinging plate 109, this aperture permitting the knurled wheel 129 and its adjacent parts to project therethrough. The shaft 132 is journalled at its opposite end in a bracket 135, mounted upon the right-hand flanged end 108 of the swinging plate 109. The right-hand side of the H-frame 122 is slotted horizontally, as at 136, to permit the frame 122 to swing relatively to the swinging plate 109 and its shaft 132.

The hub 131 is provided with a rounded notch 137, which is adapted to receive a roller 138 mounted upon a pin 139 (Figure 15) secured to the right-hand side member of the H-frame 122 (Figure 7). As a consequence, when the hub 131 rotates to the point where the notch 137 is presented opposite the roller 138, the latter enters the notch and releasably locks the hub 131 and its connected mechanism temporarily in that position. The roller 138 and the notch 137 thus serve as temporary detent and positioning devices. If the hub 131 stops with its notch 137 only partially presented to the roller 138, the latter will force its way into the notch under the urge of the coil spring 123 and will slightly rotate the hub 131 for this purpose.

The outer end of the shaft 132 is provided with a collar 140, secured thereto by the set screw 141 and carrying an outwardly projecting pin 142. Loosely mounted upon the extreme outer end of the shaft 132 is a semicircular latch lifting member 143, which carries a latch-lifting pin 144 (Figures 7 and 12 to 14). The member 143 is semicircular in form to provide an unbalanced unit, and is loosely mounted on the shaft 132 to insure that it will normally hang downward until it is engaged upon the radial flat portion 146 by the pin 142. A washer 147, mounted upon the end of the shaft 132, retains the semicircular member 143 in position against the collar 140, but permits loose swinging of the semicircular member 143 around the shaft 132.

For urging the latch bar 112 into its latching position, a coil spring 148 is attached thereto at its upper end and to the side wall 12 at the point 149, adjacent its lower end. Similarly, a coil spring 150 is connected at one end to the projecting portion 151 of the latch bar 112 and at its other end encircles the stud 99. The spring 150 urges the stud 99, the swinging arms 101 and the roller 106 in a forward direction, where the roller is out of its fold-releasing position.

Operation

In the operation of the autographic register of this invention, the zigzag folded pack of webs 52 is loaded into the space above the floor plate 14 by lifting the edge 79 of the writing table 36 into its dotted position, shown in Figure 8. The free ends of the webs 52 are threaded around the roller 106, and a fold thereof placed adjacent the aligning edge 79. So long as the roller 106 is in its forward position, as shown in Figure 8, the fold forms the apex of an acute angle and consequently the webs 52 are locked firmly in position and aligned properly thereby. The forward free ends of the webs 52 are threaded through the space between the spring fingers 38 and the knurled rollers 90, and emerge beneath the cross bar 83 which serves, in part, as a tearing edge. The parts are now in the position shown in Figure 8 (from which the webs 52 have been omitted in order to avoid confusion in the showing of the mechanism).

It is assumed that the operator has previously threaded the manifolding webs 51 into their proper positions between the record webs 52, and secured the free ends of the manifolding webs 51 in position by the bar 53. The operator now enters his record upon the uppermost web 52, this being preferably provided with a printed form for convenience. The records are duplicated upon the underlying webs 52 by means of the manifolding webs 51, and an entry of the entire transaction produced in as many copies as it is convenient to make.

The operator now grasps the handle 81 and moves it rearwardly into the cutaway portion 80 of the bridge member 76, thereby exposing the free edges of the record webs 52. The latter are pushed upwardly by the spring fingers 38 as soon as the ends thereof have been released from engagement with the rollers 90, mounted on the cross bar 83 (Figure 8). The operator then inserts his fingers into the depressed portion 37 and grasps the record webs 52, withdrawing them from the register by a forward motion. Meanwhile, the downwardly-bent portions 84 of the cross bar 83 cause the stud 94 and the reciprocating bar 98 to move rearwardly, likewise moving the swinging arms 101 and the fold-releasing roller 106 rearwardly into the fold-releasing position shown in Figures 12 and 15. The notch 117 in the latch 112 then drops down over the detent portion 118 of the reciprocating bar 98, and locks the fold-releasing roller 106 in this position. The coil spring 95 returns the swinging cross bar 83 and handle 81 to their forward positions, but the reciprocating bar 98 remains latched in its rearward position as the stud 94 slides freely back along the slot 97.

The knurled wheel 129 now urges the record webs 52 firmly into engagement with the fold-releasing roller 106 (Figures 12 and 15). As the operator withdraws the record webs 52 from the register, the motion of the webs rotates the knurled wheel 129 and this rotation accordingly rotates the pinion 128, the gear 130, the hub 131, the shaft 132 and the collar 140. The roller 138 is thereby moved forcibly out of its engagement with the notch 137 and rides upon the periphery of the hub 131 as the latter rotates. Meanwhile, the fold-releasing roller 106 has changed the angle at the fold from a normal acute angle to the obtuse angle shown in Figure 12, so that the fold passes freely over the aligning edge 79 without being detained thereby.

As the pin 142 swings around clockwise in response to the rotation of the collar 140, it reaches the position shown in Figure 13, whereat it engages the flat radial portion 145 of the loosely rotatable semicircular member 143. The latter is subsequently carried along in its rotation, causing the pin 144 carried thereby to be rotated in a clockwise direction, eventually reaching the position shown in Figure 14. The semicircular member 143 is now inverted, and the pin 144 engages and lifts the latch bar 112, (Figure 19) lifting its notch 117 out of engagement with the detent portion 118 of the reciprocating bar 98. Under the urge of the coil spring 150, the stud 94, the swinging arms 101 and the roller 106 move rapidly forward and release the webs 52 from the position shown in Figures 12 and 15. The fold, which has meanwhile been brought into position opposite the aligning edge 79, is thus presented with its adjacent portions at an acute angle, thereby locking the webs 52 in this position. Meanwhile, gravity causes the semicircular member 143 to swing around the shaft 132 into the position shown in Figure 20.

Meanwhile, the notch 137 has arrived approximately opposite the roller 138 (Figure 15) and the latter forces its way into the former, under the urge of the coil spring 123 (Figure 7). This action positively returns the knurled wheel 129 to its zero position, ready for a re-measuring operation. This is done, however, while the knurled wheel 129 is no longer in engagement with the webs 52, because the forward motion of the now released roller 106 enables the record webs to assume their acute-angled positions around the aligning edge 79. The swinging plate 109 is moved forwardly under the urge of its coil spring 119, but in its forward position the knurled wheel 129 no longer engages the webs 52. In contrast, the bent top portion 110 of the swinging plate 109 passes beneath the webs 52 and increases the locking tendency thereof at the aligning edge 79.

One important feature of the operation is therefore that the record webs 52 are aligned at the aligning edge 79 of the writing table 36 while the measuring wheel 129 and its connected mechanism are no longer in engagement therewith. The effect of this is to eliminate cumulative errors because the measuring wheel 129 and its associated mechanism constantly return to their zero positions, as indicated by the entrance of the roller 138 into the notch 137 (Figure 15), without affecting the record webs 52.

The operator may now detach the written portions of the webs 52 by tearing them at the fold, which is now adjacent the forward edge of the cross bar 83. The latter serves as a tearing edge, and the folds are preferably indented, perforated or otherwise weakened to assist this action. The operator may now press the button 62 and open the closure 26 to insert a duplicate record into the storage compartment 17. The other copies of the written record may be disposed of in the customary manner, one being given to the purchaser and others being sent to the bookkeeping or other departments concerned with the transaction.

When the next transaction is made the operator repeats the same procedure. When he again pushes the handle 81 rearwardly he again brings the roller 106 into fold-releasing position, and likewise brings the record webs 52 into engagement with the knurled measuring wheel 129. The latter again starts at zero, and its measuring action is therefore accurate as cumulative errors cannot occur. The measuring mechanism always returns to zero at the end of each transaction and withdrawal, and the gears and pins are made of such dimensions and arrangement as to cause the hub 131 to execute a complete revolution while one fold of the record webs 52 moves from the aligning edge 79 to the tearing edge of the cross bar 83.

The nature of the measuring mechanism of the present invention and its slight path of contact with the webs prevent the curling of the webs, which has been a disadvantage of guiding mechanisms in prior art registers. In the present invention the webs are withdrawn freely by the operator, with a very slight amount of engagement by guiding members, so that this curling effect is substantially absent, particularly in view of the narrow engaging face of the knurled roller 129 which controls the measuring operation.

Associated with the angle member 19 is an arm 160 (Figures 7 and 9) on which a quadrant member 161 is pivotally mounted, as at 162. The free end of the quadrant member 161 carries a projection 163, which is adapted to engage the swinging frame 109 or a portion thereof when the frame 109 is withdrawn rearwardly to a predetermined position. The purpose of this quadrant 161 and its projection 163 is to hold the swinging frame 109 in an open position while the writing table 36 is lifted into the dotted position shown in Figure 8 for the purpose of loading or unloading the autographic register with a pack of zigzag folded record webs.

It will be understood that I desire to comprehend within my invention such modifications as come within the scope of the claims and the invention.

Having thus fully described my invention, what I claim as new and desire to secure by Letters Patent, is:

1. In an autographic register, a writing support, a holder for holding a zigzag folded web, an aligning device for engaging said folds to align and lock said web, means for releasing said folds from locking engagement with said aligning device, and web-measuring means operated by the movement of the web and responsive to the withdrawal of a predetermined amount of said web for reengaging a fold thereof with said aligning device.

2. In an autographic register, a writing support, a holder for holding a zigzag folded web, an aligning device for engaging said folds to align and lock said web, a movable guide movable relatively to said aligning device into web-unfolding position for unfolding and directing said web around said aligning device, and measuring means operated by the movement of the web and responsive to the withdrawal of a predetermined amount of said web to move said guide out of web-unfolding position while moving a fold of said web into locking position at said aligning device.

3. In an autographic register, a writing support, a holder for holding a zigzag folded web, an aligning device for engaging said folds to align and lock said web, means for releasing said folds from locking engagement with said aligning device, measuring means responsive to a predetermined motion of said web for reengaging a fold thereof with said aligning device, and means responsive to the termination of said predetermined motion for retracting said measuring means from operation.

4. In an autographic register, a writing support, a holder for holding a zigzag folded web, an aligning device for engaging said folds to align and lock said web, means for releasing said folds from locking engagement with said aligning device, measuring means responsive to a predetermined motion of said web for reengaging a fold thereof with said aligning device, and means responsive to the arrival of said web at the end of its predetermined motion for disengaging said measuring means from said web.

5. In an autographic register, a holder for holding a zigzag folded record web, an aligning device for engaging a fold of said web to lock said web, means for manually releasing said web from locking engagement with said aligning device, and measuring means responsive to the withdrawal of a predetermined length of said web for removing said releasing means from its web-releasing position whereby to condition said aligning device for relocking engagement with a subsequent fold of said web.

6. In an autographic register, a holder for holding a zigzag folded record web, an aligning device for engaging a fold of said web to lock said web, means for manually releasing said web from locking engagement with said aligning device, measuring means responsive to the withdrawal of a predetermined length of said web for removing said releasing means from its web-releasing position whereby to condition said aligning device for relocking engagement with a subsequent fold of said web, and means concomitant with the disabling of said releasing means for disengaging said measuring means.

7. In an autographic register, a holder for holding a zigzag folded record web, an aligning device for engaging a fold of said web to lock said web, means for manually releasing said web from locking engagement with said aligning device, measuring means responsive to the withdrawal of a predetermined length of said web for removing said releasing means from its web-releasing position whereby to condition said aligning device for relocking engagement with a subsequent fold of said web, and means associated with said measuring means for urging said measuring means into its zero position in response to the relocking of said web after said withdrawal.

8. In an autographic register, a frame having a writing table associated therewith, a holder for holding a zigzag folded record web, means for engaging a fold in said web to align and lock said web in writing position, detent means spaced apart from said aligning means for engaging the free end of said web, a releasing member for releasing the fold of said web from said aligning means, and manually operated means for concomitantly disengaging said detent means and said web-releasing member.

9. In an autographic register, a frame having a writing table associated therewith, a holder for holding a zigzag folded record web, means for engaging a fold in said web to align and lock said web in writing position, detent spaced apart from said aligning means for engaging the free end of said web, manually operated means for disengaging said detent, mechanism operatively connected to said manually operated means and responsive to the detent-disengaging operation of said manually operated means for assisting said web around said aligning means, and a tear-off element associated with said detent means.

10. In an autographic register, a writing table, a holder for holding a zigzag folded record web, an aligning device for engaging a fold in said web to lock said web, a movable frame, measuring mechanism on said frame, a fold-releasing member associated with said aligning device and movable relatively to said aligning device into fold-releasing relationship therewith, and means interconnecting said measuring mechanism with said fold-releasing member and responsive to a predetermined movement of said web for withdrawing said fold-releasing member from its fold-releasing position whereby to condition said aligning device for relocking engagement with a subsequent fold of said web.

11. In an autographic register, a writing table, a holder for holding a zigzag folded record web, an aligning device for engaging a fold in said web to lock said web, a movable frame, measuring mechanism on said frame, a fold-releasing member associated with said aligning device and movable relatively to said aligning device into fold-releasing relationship therewith, and means interconnecting said measuring mechanism with said fold-releasing member and responsive to a predetermined movement of said web for withdrawing said fold-releasing member from its fold-releasing position and for disengaging said measuring mechanism at the termination of the measuring operation whereby to condition said aligning device for relocking engagement with a subsequent fold of said web.

12. In an autographic register having a writing table, means for guiding paper from beneath said table over one edge thereof and upon the table whereby the paper is angularly disposed with respect to said edge for alignment of the paper on transverse creases therein, a swinging paper-engaging means for holding it in aligned condition against said edge, means to hold said engaging means out of engagement with the paper while it is being moved over said edge, a measuring means responsive to the movement of the paper for controlling the movement of said paper-engaging means, and means operated by said measuring means in response to a predetermined movement of the paper for releasing the paper-engaging means.

13. In an autographic register having a writing table beneath which there is a paper storage compartment from which a plurality of sheets is fed over the rear edge of the writing table, said paper having transverse superimposed creases in the superimposed sheets, the combination of a swinging paper-engaging means engageable with the paper beneath the rear edge of the writing table after it has moved thereover a predetermined distance with the transverse creases in engagement with the rear edge of the writing table, a measuring means carried thereby and engageable with the paper and actuated by the paper as it passes over the writing table when the paper-engaging means is out of engagement with the paper, and means controlled by said paper-measuring means for releasing the paper-engaging means to engage the paper in response to the motion of said paper a predetermined distance.

14. In an autographic register having a writing table beneath which there is a paper storage compartment from which a plurality of sheets is fed over the rear edge of the writing table, said paper having transverse superimposed creases in the superimposed sheets, the combination of a swinging paper-engaging means engageable with the paper beneath the rear edge of the writing table after it has moved thereover a predetermined distance with the transverse creases in engagement with the rear edge of the writing table, a measuring means carried thereby and engageable with the paper and actuated by the paper as it passes over the writing table when the paper engaging means is out of engagement with the paper, means controlled by said paper-measuring means for releasing the paper-engaging means to engage the paper in response to the motion of said paper a predetermined distance, and means engaging the forward end of the paper and concealing the forward end thereof so connected to the paper-engaging means that upon the backward movement of the forward paper-engaging means the first-mentioned paper-engaging means will be disengaged from the rear of the paper.

15. In an autographic register having a plurality of sheets of paper stored beneath a writing table and fed over the rear edge of the writing table, said sheets having transverse line scorings, a forward paper-engaging means mounted for forward and rearward movement at the front of the writing table, and a rear paper-engaging means engageable with the sheets beneath the rear edge of the writing table to hold the creases of the sheets on the edge of the writing table, said rear engaging means being disengageable from the paper in response to the rearward movement of the forward means disengaging the forward ends of the paper.

16. In an autographic register having a plurality of sheets of paper stored beneath a writing table and fed over the rear edge of the writing table, said sheets having transverse line scorings, a forward paper-engaging means mounted for forward and rearward movement at the front of the writing table, a rear paper-engaging means engageable with the sheets beneath the rear edge of the writing table to hold the creases of the sheets on the edge of the writing table, said rear engaging means being disengageable from the paper in response to the rearward movement of the forward means disengaging the forward ends of the paper, and means for releasing the forward engaging means for forward movement while the rear engaging means remains locked out of engagement with the paper.

17. In an autographic register having a plurality of sheets of paper stored beneath a writing table and fed over the rear edge of the writing table, said sheets having transverse line scorings, a forward paper-engaging means mounted for forward and rearward movement at the front of the writing table, a rear paper-engaging means engageable with the sheets beneath the rear edge of the writing table to hold the creases of the sheets on the edge of the writing table, said rear engaging means being disengageable from the paper in response to the rearward movement of the forward means disengaging the forward ends of the paper, means for releasing the forward engaging means for forward movement while the rear engaging means remains locked out of engagement with the paper, and measuring means engageable with the paper when the rear engaging means is disengaged therefrom and actuated by the movement of the paper whereby upon a predetermined actuation by the paper the rear engaging paper means will be unlocked and engaged with the paper.

18. In combination in an autographic register employing a plurality of sheets adapted to be aligned on the rear edge of a writing table, means for engaging the paper to align it on the rear edge of the writing table, means to hold said engaging means out of engagement, and a measuring means operated by the paper as it moves over the writing table and responsive to a predetermined movement of the paper and the measuring means to unlock the paper-engaging means to engage it with the paper and hold the paper in alignment against the rear edge of the writing table.

19. In combination in an autographic register employing a plurality of sheets adapted to be aligned on the rear edge of a writing table, means for engaging the paper to align it on the rear edge of the writing table, means to hold said engaging means out of engagement, a measuring means operated by the paper as it moves over the writing table and responsive to a predetermined movement of the paper and the measuring means to unlock the paper-engaging means to engage it with the paper and hold the paper in alignment against the rear edge of the writing table, and means mounted for forward and rearward movement over the writing table and operative when moved backwardly to uncover the paper ends and to move the paper-engaging means to locked position.

20. In an autographic register having a plurality of paper sheets adapted to be aligned on the rear edge of a writing table, means to engage the paper to move that portion adjacent the rear edge of the writing table and beneath the writing table to a point beneath it to cause the paper sheets to align on transverse folds therein, means associated with said paper-engaging means for moving the paper beneath the writing table adjacent its rear edge to a point behind the edge of the writing table so as to disengage the transverse folds from the rear edge of the writing table, and a measuring means engageable with the paper as it moves and actuated thereby for placing one of said means in fold-locking relationship with the paper while moving the other means out of fold-releasing relationship with the rear aligning edge of the writing table.

21. In an autographic register having an aligning member and a plurality of folded paper sheets adapted to be aligned on said aligning member by an angular disposition with reference thereto, means for moving the paper sheets passing from beneath and over said aligning member to a position back of said member to disengage the sheets therefrom; means to move said sheets beneath said member to engage the sheets with the member to align them and hold them in aligned position; and a measuring means engageable with said sheets while they are freely moving and actuated by said sheets for placing one of said means in fold-locking relationship with respect to said member while withdrawing the other means from fold-releasing relationship therewith in response to the motion of said sheets a predetermined distance.

22. In an autographic register, a writing support, a holder for holding a zigzag folded web, an aligning device for engaging said folds to align and lock said web, a web-unfolding member advanceable relatively to said aligning device into web-unfolding position for unfolding and directing the folds of said web around said aligning device, web-folding means for folding the folds of said web at said aligning device and movable into web-folding position at said aligning device for locking said folds against said aligning device concomitantly with the retraction of said web-unfolding member, means for urging said web-unfolding member toward its retracted position, means for releasably holding said web-unfolding member in web-unfolding position, and means responsive to a predetermined motion of said web for actuating said holding means to release said web-unfolding member for motion into its retracted position.

CLAYTON E. WYRICK.